Patented Jan. 2, 1945

2,366,464

UNITED STATES PATENT OFFICE 2,366,464

MANUFACTURE OF TETRAHYDROFURAN

Christopher Lumley Wilson, Blackley, Manchester, England, assignor to Imperial Chemical Industries Limited, a corporation of Great Britain No Drawing. Application June 2, 1942, Serial No. 445,483. In Great Britain June 16, 1941

7 Claims. (Cl. 260—345)

This invention relates to a new catalytic process wherein tetrahydrofurfuryl alcohol is converted into tetrahydrofuran.

According to the invention I provide a process for the manufacture of tetrahydrofuran which comprises contacting tetrahydrofurfuryl alcohol in the vapour phase with a nickel or nickel-containing catalyst at temperatures above 200° C. and, if desired, isolating the tetrahydrofuran from the products of reaction.

A suitable catalyst may be prepared by distributing nickel nitrate on a substrate, for example, on granulated pumice or silica gel, heating to convert the nitrate into oxide, and then reducing the oxide with hydrogen. Other catalysts which have been found satisfactory are nickel, copper, and manganese oxide in approximately the ratio 5:1:8 deposited together on pumice, nickel gauze which has been treated as is described in Example 3, Monel metal gauze (66% nickel, 30% copper) and granular Raney alloy (containing 50% nickel, 50% aluminium) which has been treated as is described in Example 9.

I believe that the conversion of tetrahydrofurfuryl alcohol into tetrahydrofuran involves firstly the conversion of the alcohol into tetrahydrofurfuraldehyde and secondly the elimination of carbon monoxide from this aldehyde, in accordance with the following scheme:

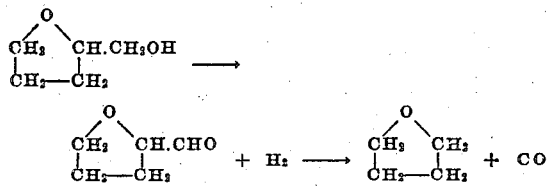

Whether or not this scheme represents a true picture of the nature of the conversion, and it is not intended to be limiting in any way, it serves to explain at least one observed fact, namely, the formation of carbon monoxide and hydrogen in approximately equimolecular proportions.

In carrying the process of the invention into effect, the tetrahydrofurfuryl alcohol is vaporized, preferably in a vaporizing chamber, and the vapours are passed over the heated catalyst, if desired, with the help of hydrogen, carbon dioxide or nitrogen or some other inert gas. Using nickel supported on pumice as the catalyst, satisfactory results have been obtained by working with the catalyst heated at temperatures of 260–300° C. Using any of the catalysts listed above it has been found that the optimum working temperature lies between 240° C. and 300° C. at atmospheric pressure. Whilst satisfactory results have been obtained by working at atmospheric pressures, reduced or elevated pressures may also be used. When a nickel gauze catalyst is used the effect of working at a reduced pressure is to reduce also the optimum working temperature.

After contact with the hot catalyst the vapours are cooled and the liquid products of reaction are collected. These consist of tetrahydrofuran, dihydrofuran, and unchanged tetrahydrofurfuryl alcohol, together with small amounts of water, furan, n-butyraldehyde and n-butyl alcohol. Purification may be effected in three stages. The first stage may consist in washing the crude product with a 40% aqueous solution of sodium bisulphite followed by a drying of the washed product by standing over anhydrous calcium chloride. Or the crude product may be allowed to stand over granular sodium hydroxide or potassium hydroxide. The second stage consists in fractional distillation. By this means fractions rich in tetrahydrofuran may be obtained. These frequently also contain varying small quantities of dihydrofuran, the amount depending on the particular conditions of the conversion, for example on the catalyst used. This may be removed if necessary by, for example, converting it into tetrahydrofuran by liquid phase hydrogenation in the presence of, for example, Raney nickel or platinum black catalysts.

The combined yield of tetrahydrofuran and dihydrofuran calculated on the quantity of tetrahydrofurfuryl alcohol consumed varies from 30 to 50% of the theoretical value. The yield of tetra- and dihydro-furans is decreased by an increase in the temperature of reaction but the tetrahydrofurfuryl alcohol consumed is increased.

Fractions obtained during the distillation which are rich in or consist essentially of tetrahydrofurfuryl alcohol may be, if desired, recycled.

Tetrahydrofuran itself and fractions rich in same are useful as solvents.

The invention is illustrated but not limited by the following examples:

Example 1

Tetrahydrofurfuryl alcohol is gradually introduced into a vaporizing chamber and the resulting tetrahydrofurfuryl alcohol vapours are passed over a nickel-on-pumice catalyst heated in a catalyst chamber to a temperature of 260° C., the rate of passage being 85 gms. per hour per litre of catalyst. The vapours leaving the catalyst chamber are cooled in cooling traps whereby the liquid products of reaction are condensed, thus stripping them from the gaseous products of reaction in which carbon monoxide and hydrogen are present in approximately equal volumes. The liquid is collected, distilled and the fraction boiling at 55–75° C. is retained.

This crude tetrahydrofuran is sufficiently pure for many technical purposes, for example, for use as a solvent, but pure tetrahydrofuran boiling at 64–66° C. can be obtained by a further fractional distillation.

The nickel-on-pumice catalyst used in this example is made as follows: 150 parts of nickel nitrate (hexahydrate) are fused in a steam heated vessel and 150 parts of granular pumice (8–16 mesh) are charged in with stirring. The stirred mass is allowed to cool and the granular product is then packed into the catalyst chamber. A rapid stream of air is passed through the chamber whilst heating gradually to 400° C. When water and oxides of nitrogen cease to be evolved, the resulting nickel oxide on pumice is reduced by passing a stream of hydrogen whilst maintaining the temperature at 300–350° C. The activity of the catalyst can be further improved by heating it to 550–600° C., re-oxidising by passing a stream of air, cooling to and maintaining at 300–350° C., and again reducing by passing a stream of hydrogen.

Example 2

Tetrahydrofurfuryl alcohol (145.5 cc., 153 g., 1½ gram. mol.) is vaporized and the vapour is introduced during 4 hours into a catalyst chamber containing a nickel on silica gel catalyst maintained at 305° C. Carbon dioxide at a speed of 2 litres per hour is simultaneously passed through the tube. The liquid products are condensed in a receiver, cooled to −78° C. and distilled. There is obtained 32 cc. of a liquid of B. P. 50–75° C. and also 46 cc. of a liquid of B. P. 160–185° C. which consists essentially of unreacted tetrahydrofurfuryl alcohol. The fraction of lower boiling point, after drying over potassium hydroxide gives a product of B. P. 57–66.5° C. The yield is 25 cc., i. e. 22.2 g. This product still contains 11.2% of dihydrofuran. The yield of mixed tetrahydro- and dihydrofurans is 30% of that theoretically obtainable from the tetrahydrofurfuryl alcohol consumed.

The tetrahydrofuran containing some dihydrofuran gives when reduced with hydrogen in presence of a platinum black catalyst, pure tetrahydrofuran of B. P. 65–66.5° C.

The catalyst used in this example is made as follows: 150 grams of silica gel are heated with concentrated nitric acid at 100° C. during 10 hours. This is then washed thoroughly with water, and the product is mixed with 100 grams of nickel nitrate hexahydrate, 50 grams of nickel carbonate and 50 grams of water, and the mixture is stirred and heated to 100° C. Stirring and heating are continued until the mass becomes granular in form. This product is then packed into the catalyst chamber which consists of a Pyrex tube 26 mm. in internal diameter and 80 cm. long. It is then heated slowly to 400° C. and reduced by passing a current of hydrogen over it.

Example 3

48 cc. of tetrahydrofurfuryl alcohol is vaporized and passed through a catalyst chamber at 270° C. during 2 hours. The catalyst is made as is that used in Example 2 except that there is used a mixture of 126 grams of nickel nitrate hexahydrate, 22 grams of copper nitrate hexahydrate and 142 grams of manganese nitrate hexahydrate in 100 parts of water and this is added to 100 grams of granulated pumice (8–16 mesh). The product of reaction is distilled and affords 12.1 cc. of crude tetrahydrofuran of B. P. 50–75° C. and 19.0 cc. of unchanged tetrahydrofurfuryl alcohol.

Example 4

130 grams of a nickel on pumice catalyst, prepared as described in Example 1, is placed in a catalyst chamber and heated to 240° C. 97 cc. of tetrahydrofurfuryl alcohol are then slowly introduced over a period of 4 hours, during which time the temperature is slowly raised to 270° C. The liquid effluent affords when distilled 25.7 cc. of a liquid B. P. 50–75° C. and 44 cc. unreacted tetrahydrofurfuryl alcohol. The lower boiling fraction after potash treatment gives 18.8 cc. (17.1 g.) of a liquid of B. P. 64.5–66.5° C. which still contains 4.1% dihydrofuran. The yield of hydrogenated furans is 43% of that theoretically obtainable from the tetrahydrofurfuryl alcohol consumed

Example 5

A catalyst is prepared from nickel gauze as follows: 6 square feet (620 grams) of nickel gauze of 28 meshes to the linear inch is fashioned into compact rolls and packed into a Pyrex tube of 26 mm. internal diameter. A length of 56 cm. of the tube is thus filled. The catalyst is then heated to 550° C. and a stream of chlorine is passed through the tube for 4 hours. The chlorine is then replaced by hydrogen, a current of which was passed for 2 hours. Air is then passed during about 8 hours. The two latter stages using hydrogen and air are repeated until during the passage of hydrogen, hydrogen chloride is no longer evolved. After a final oxidation by passage of air at 550° C. followed by a reduction with hydrogen at 350° C. the catalyst is ready for use. The water produced during the final reduction was 6 ccs.

194 cc. of tetrahydrofurfuryl alcohol is passed over the catalyst heated to 270° C. during 3½ hours. The product when distilled gives 53 cc. of a liquid of B. P. 50–160° C. and 64.3 cc. of a liquid of B. P. 160–185° C. which contains 90% of unchanged tetrahydrofurfuryl alcohol. The fraction of lower boiling point after drying over sodium hydroxide is redistilled and gives 39 cc. (34.8 g.) of a liquid of B. P. 64.5–66.5° C. This material product contains 3.5% of dihydrofuran. The yield of tetra- and dihydro-furans is 34% of that theoretically obtainable from the amount of tetrahydrofurfuryl alcohol consumed.

Example 6

The catalyst after use as described in Example 4 is reactivated by passing over it a slow stream of hydrogen at 550° C. during 16 hours. The temperature is then reduced to 300° C, the hydrogen stream is stopped, and 48.5 cc. of tetrahydrofurfuryl alcohol is introduced into the catalyst chamber during 1 hour. The product after distillation consists of 11.2 cc. of unchanged tetrahydrofurfuryl alcohol and a fraction of lower boiling point which, after treatment with potassium hydroxide gives 13.9 grams of a liquid B. P. 63–65.5° C. This latter material contains 7.2% of dihydrofuran, the remainder being tetrahydrofuran. The yield of tetra- and dihydro-furans is 50% of that theoretically obtainable from the tetrahydrofurfuryl alcohol consumed.

Example 7

The catalyst after use as described in Example 4 is reactivated by passage of a current of air at 550° C. for 8-10 hours followed by reduction by means of a current of hydrogen at 350° C. during 2 hours, 48.5 cc. of tetrahydrofurfuryl alcohol is then introduced slowly into the catalyst chamber which is maintained at 225° C. while the pressure is reduced to that of 120±40 mm. of mercury as measured at the exit end of the catalyst chamber. This process takes one hour. The product is distilled and gives 13.1 cc. of a liquid of B. P. 50-160° C. which after treatment with potash and redistillation gives 8.0 gms. of a liquid of B. P. 55-66.5° C. This product contains 25.5% of dihydrofuran. The yield of tetra- and dihydro-furans is 43% of that theoretically obtainable from the tetrahydrofurfuryl alcohol consumed.

Example 8

354 grams of Monel metal gauze containing 30% Cu and 66% Ni of 60 mesh is cut into small pieces and packed into the catalyst chamber. The alloy is subjected to alternate oxidation and reduction as is described in Example 2 until the water produced during a single cycle is 5.5 cc. The catalyst is then heated to 270-280° C. and 97 ccs. (102 grams) of tetrahydrofurfuryl alcohol is introduced during a period of 2 hours. The product when distilled consists of 32.5 cc. (28.9 g.) of a liquid of B. P. 45-160° C. and 40 cc. of a liquid of B. P. 160-185° C. After treatment with potash the material of lower boiling point gives 18.6 grams of a liquid of B. P. 55-66.5° C. which contains 18.3% dihydrofuran. The yield of tetra- and dihydro-furans is 44% of that theoretically obtainable from the tetrahydrofurfuryl alcohol consumed.

Example 9

460 grams of Raney alloy is granulated and sieved to 8-16 mesh and is then heated to 400-450° C. and treated by passage of a current of hydrogen chloride during 3 hours at a speed of 15 litres per hours. Aluminium chloride is formed during this process and sublimes and passes from the tube with the effluent gases. The catalyst is then removed from the catalyst chamber, mixed well and replaced. It is then heated to 550° C. and a current of air is passed over it for several hours and this is then replaced by hydrogen while the chamber is cooled to 350° C. During the last process 6.0 cc. of water are produced. Tetrahydrofurfuryl alcohol (48.5 cc.) is then passed over the catalyst heated to 255° C. during one hour. The product when distilled gives 21.1 cc. of a liquid of B. P. below 160° C. and 4.3 cc. of unchanged tetrahydrofurfuryl alcohol. The fraction of lower B. P. after treatment with potassium hydroxide gives on redistillation 13.6 g. of a liquid of B. P. 65-66.5° C. and this contains 0.9% of dihydrofuran. The yield of tetrahydrofuran is 41% of that theoretically obtainable from the tetrahydrofurfuryl alcohol consumed.

I claim:

1. A process for the manufacture of tetrahydrofuran which comprises contacting tetrahydrofurfuryl alcohol in the vapor phase with a nickel catalyst at temperatures above 200° C. and not substantially above 300° C. and at pressures not substantially in excess of atmospheric in the absence of added hydrogen.

2. A process for the manufacture of tetrahydrofuran which comprises contacting tetrahydrofurfuryl alcohol in the vapor phase with a nickel catalyst at temperatures of from about 240° C. to about 300° C. at substantially atmospheric pressures in the absence of added hydrogen.

3. A process for the manufacture of tetrahydrofuran which comprises contacting tetrahydrofurfuryl alcohol in the vapor phase with a supported nickel catalyst at temperatures above 200° C. and not substantially above 300° C. and at pressures not substantially in excess of atmospheric in the absence of added hydrogen.

4. A process for the manufacture of tetrahydrofuran which comprises contacting tetrahydrofurfuryl alcohol in the vapor phase with a nickel-on-pumice catalyst at temperatures above 200° C. and not substantially above 300° C. and at pressures not substantially in excess of atmospheric in the absence of added hydrogen.

5. A process for the manufacture of tetrahydrofuran which comprises contacting tetrahydrofurfuryl alcohol in the vapor phase with a nickel-on-pumice catalyst at temperatures of from about 260° C. to about 300° C. at substantially atmospheric pressures in the absence of added hydrogen.

6. A process for the manufacture of tetrahydrofuran which comprises contacting tetrahydrofurfuryl alcohol in the vapor phase with an activated nickel gauze catalyst at temperatures above 200° C. and not substantially above 300° C. and at pressures not substantially in excess of atmospheric in the absence of added hydrogen.

7. A process for the manufacture of tetrahydrofuran which comprises contacting tetrahydrofurfuryl alcohol in the vapor phase with an activated nickel gauze catalyst at temperatures of from about 240° C. to about 300° C. at substantially atmospheric pressures in the absence of added hydrogen.

CHRISTOPHER LUMLEY WILSON.